United States Patent [19]

Varges

[11] Patent Number: 4,732,101
[45] Date of Patent: Mar. 22, 1988

[54] STERN APRON FOR ICE BREAKERS

[75] Inventor: Günter Varges, Emden, Fed. Rep. of Germany

[73] Assignee: Thyssen Nordseewerke GmbH

[21] Appl. No.: 878,802

[22] Filed: Jun. 26, 1986

[30] Foreign Application Priority Data

Jul. 3, 1985 [DE] Fed. Rep. of Germany ....... 3523763

[51] Int. Cl.$^4$ .............................................. B63B 35/08
[52] U.S. Cl. ........................................ 114/41; 114/40; 114/56; 114/57; 440/71
[58] Field of Search ................. 114/40, 41, 57, 56; 440/71

[56] References Cited

U.S. PATENT DOCUMENTS

| 2,127,475 | 8/1938 | Yourkevitch | 114/57 |
| 2,953,113 | 9/1960 | Baer | 440/71 |
| 3,521,590 | 7/1970 | German et al. | 114/41 |
| 3,635,186 | 1/1972 | German | 114/57 |
| 3,850,125 | 11/1974 | Anders | 114/40 |
| 3,991,696 | 11/1976 | Aoki | 114/57 |
| 4,428,735 | 1/1984 | Gruzling et al. | 440/71 |
| 4,506,617 | 3/1985 | Waas et al. | 114/56 |

FOREIGN PATENT DOCUMENTS

| 878001 | 12/1954 | Fed. Rep. of Germany . |
| 952153 | 11/1956 | Fed. Rep. of Germany . |
| 1106558 | 12/1955 | France .................. 114/57 |

Primary Examiner—Joseph F. Peters, Jr.
Assistant Examiner—Thomas J. Brahan
Attorney, Agent, or Firm—Toren, McGeady & Associates

[57] ABSTRACT

The stern apron is constructed as a volume body tapering to a sharp end in streamlined manner towards the stern of the ship and which at its lower outer edges is in each case wider than in the overlying region, so that the ship's resistance and the necessary propulsive power when travelling in open water is reduced and, particularly when moving astern, the propulsion and control members are protected against contact with the ice.

9 Claims, 1 Drawing Figure

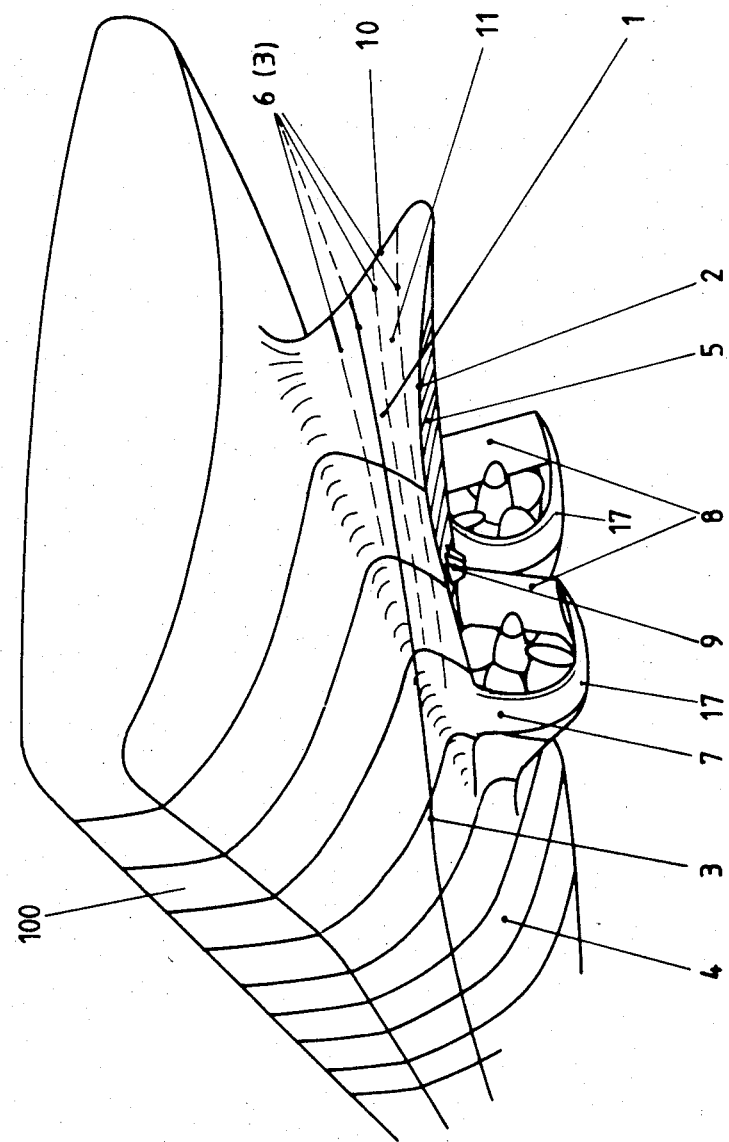

STERN APRON FOR ICE BREAKERS

BACKGROUND OF THE INVENTION

The present invention relates to a stern apron or guard plate above propellers and rudders of ice breakers.

Particularly when moving astern in ice-covered waters, the propellers and rudders of ice breakers are exposed to an increased damage risk through contact with the ice. The thrust and efficiency of the propellers can also be reduced by contact with the ice and even, in the case of ducted propellers, can approach zero, so that the desired propulsion or advance is reduced or lost.

To obviate these disadvantages, it has been proposed to have aprons emanating from the hull, which keep broken ice sliding along said hull away from the propulsion and control members, both from the front in the case of moving ahead and from the rear when moving astern. These known apron arrangements suffer from the disadvantage of greatly increasing the open water resistance of the hulls equipped with such aprons and also only offer a limited protection against the unwelcome ice contact of propulsion and control members.

SUMMARY OF THE INVENTION

The problem of the present invention is to provide a stern apron for ice breakers, which reduces the ship's resistance and the necessary propulsive power in open water and which much more effectively protects the propulsion and control members against ice contact, particularly when moving astern through solid ice coverings.

In order to solve this problem proposal is made of a stern apron which—according to the invention—is constructed as a volume body tapering to a sharp end in streamlined manner towards the stern and which at its lower outer edges is wider than in the overlying region.

In the case of a stern apron constructed in this way, the trailing edge of the stern apron volume body acts in the manner of the cutting edge of a ploughshare and moves the floating ice of the breaking ice cover or the already broken ice along the top of the stern apron past both propellers and rudders, namely in the afterbody region upstream thereof. However, when travelling in open water, the stern apron volume body prevents a separation of the flow from the stern behind the propellers and consequently reduces the propulsive power required for the advance compared with a ship not having a stern apron.

According to a further embodiment the invention provides for a construction wherein, towards the forebody, the stern apron passes constantly into the shape of the afterbody. The bottom of the stern apron in the frame plane is flat or V-shaped or adapted to the backwash contour.

Advantageously, the water lines, including the ice breaking water line of the stern apron form an angle of less than 20° to the median plane of the ship.

Furthermore, the stern apron bottom can be directed downwards towards the stern. Exceeding that it will be advantageous if the cross-section of the stern apron passes constantly into the outer contours of outwardly positioned propeller nozzles.

In addition the invention plans that a plurality of juxtaposed ice cutters are provided on the bottom of the stern apron behind each rudder and which are made from thin profiles or sheets and positioned parallel to the particular rudder median plane. The lateral bottom edges of the volume body of the stern apron are sharp-edged over long areas between the propellers and the stern. The stern apron may extend over a region above and below the ice breaking water line.

DESCRIPTION OF THE DRAWINGS AND PREFERRED EMBODIMENT

The invention is described in greater detail hereinafter relative to an embodiment and the attached drawing, which shows an afterbody with a streamlined stern apron volume body in a diagrammatic view.

The afterbody 4 of a hull 100 has a streamlined stern apron volumetric body 1, which tapers to a sharp end in streamline manner towards the stern. The volumetric body 1 is wider at its lateral bottom and outer edges 2 than in the overlying region. The stern apron can also extend over a region above and below the ice breaking water line 3. The bottom of the stern apron is designated 5 and the apron water lines 6. The stern apron trailing edge is 10 and its top is 11.

Towards the forebody, the stern apron volume body 1 passes constantly into the shape of the afterbody 4. The bottom 5 of the stern apron is preferably constructed in a flat or V-shaped manner in the frame plane, but can also be adapted to the contour of the backwash. The water lines 6, including the ice breaking water line 3 of the stern apron can form an angle of less than 20° to the median plane of the ship. The stern apron bottom 5 is directed downwards in the direction of the stern.

In the case of ice breakers with ducted propellers, the cross-section of the stern apron passes constantly into the outer contour 7 of the outer propeller nozzles 17.

Behind each rudder 8 on the bottom 5 of the stern apron are provided a plurality of juxtaposed ice cutters 9 made from thin profiles or sheets and which are parallel to the particular rudder median plane. In addition, the lateral bottom edges 2 of the stern apron volume body 1 can be made sharp-edged over long areas between the propellers and the stern.

Accordingly, the stern apron is constructed as a volumetric body tapering to a sharp end in streamlined manner towards the stern of the ship and which at its lower outer edges is in each case wider than in the overlying region, so that the ship's resistance and the necessary propulsive power when travelling in open water is reduced and, particularly when moving astern, the propulsion and control members are protected against contact with the ice.

What is claimed is:

1. A stern apron above propellers and rudders on an ice breaker, said ice breaker including a hull having a bow, a stern and an afterbody extending from the stern toward the bow, said stern apron comprises a volumetric body extending downwardly from said afterbody and rearwardly of said propellers and rudders and tapering in a streamlined manner to a sharp end toward the stern, said volumetric body having lower outer edges extending in the bow-stern direction and spaced below said afterbody and said lower outer edges being wider than said volumetric body in the region between said afterbody and said lower outer edges, said volumetric body being integrated into the shape of said afterbody, said hull having a median plane extending upwardly and in the bow-stern direction and upwardly extending frame planes extending transversely of the median plane, and said volumetric body having water lines including an ice breaking line extending generally in the bow-stern direction and forming an angle of less than 20° with respect to the median plane.

2. A stern apron according to claim 1, wherein said stern apron has a flat bottom extending transversely of the median plane.

3. A stern apron according to claim 1, wherein said stern apron has an inverted V-shaped bottom extending transversely of said median plane.

4. A stern apron according to claim 1, wherein the stern apron has a bottom adapted to a backwash contour.

5. A stern apron according to claim 2, 3 or 4, wherein the bottom of said stern apron extends downwardly toward the stern.

6. A stern apron according to claim 2, 3 or 4, wherein said ice breaker has ducted propellers located below said stern apron and each said ducted propeller having an outer contour, and said stern apron has a cross-section extending transversely of the median plane passing constantly into the outer contours of said ducted propellers.

7. A stern apron according to claim 1, wherein said stern apron has a bottom with juxtaposed ice cutters located on and extending downwardly from said bottom with said ice cutters located rearwardly of each said rudder, each said rudder has a median plane, each said ice cutter is a thin sheet member positioned parallel to the corresponding rudder median plane.

8. A stern apron as set forth in claim 1, wherein said lower outer edges of said volumetric body are sharp-edged in the bow-stern direction between said propellers and the stern.

9. A stern apron according to claim 1, wherein said stern apron extends in the vertical direction above and below the ice-breaking line.

* * * * *